US007010116B1

(12) United States Patent
Fleming, III

(10) Patent No.: US 7,010,116 B1
(45) **Date of Patent: *Mar. 7, 2006**

(54) METHOD OF PROGRAMMING TELEPHONE NUMBERS AND IDENTIFIERS IN A TELEPHONE

(75) Inventor: Hoyt A. Fleming, III, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/217,255

(22) Filed: Dec. 21, 1998

(51) Int. Cl.
*H04M 1/56* (2006.01)

(52) U.S. Cl. ....................... 379/356; 379/355; 455/564

(58) Field of Classification Search ................ 379/354, 379/70, 88.19, 88.15, 142.04, 142.06, 356.01, 379/355.07, 355; 455/564
See application file for complete search history.

(56) References Cited

U.S. PATENT DOCUMENTS

| | | | | |
|---|---|---|---|---|
| 5,062,132 A | | 10/1991 | Yasuda et al. | |
| 5,109,403 A | | 4/1992 | Sutphin | |
| 5,247,565 A | | 9/1993 | Joglekar et al. | |
| 5,247,700 A | | 9/1993 | Wohl et al. | |
| 5,339,352 A | | 8/1994 | Armstrong et al. | |
| 5,452,346 A | * | 9/1995 | Miyamoto | 379/142.04 |
| 5,457,732 A | | 10/1995 | Goldberg | |
| 5,485,505 A | | 1/1996 | Norman et al. | |
| 5,561,705 A | | 10/1996 | Allard et al. | |
| 5,568,546 A | * | 10/1996 | Marutiak | 379/355.05 |
| 5,689,547 A | | 11/1997 | Molne | |
| 5,722,084 A | | 2/1998 | Chakrin et al. | |
| 5,737,700 A | | 4/1998 | Cox et al. | |
| 5,764,731 A | * | 6/1998 | Yablon | 379/88.15 |
| 5,768,362 A | * | 6/1998 | Moon | 379/355.05 |
| 5,797,098 A | | 8/1998 | Schroeder et al. | |
| 5,828,956 A | | 10/1998 | Shirai | |
| 5,930,703 A | | 7/1999 | Cairns | |

(Continued)

FOREIGN PATENT DOCUMENTS

JP 4-126433 A 4/1992

(Continued)

OTHER PUBLICATIONS

Mobile Office DI 27. Mobile Office DI 27 for *GSM* 1900. http://www.ericsson.se/US/phones/data/dpy90131.htm (Nov. 15, 1998).

(Continued)

*Primary Examiner*—Sinh Tran
*Assistant Examiner*—Walter F Briney III
(74) *Attorney, Agent, or Firm*—Perkins Coie LLP

(57) ABSTRACT

A method and telephone apparatus which detects when a telephone number has been entered into the telephone and determines if the entered telephone number has previously been stored in the memory of the telephone is provided. If the entered telephone number has not been previously stored, it is then stored into memory. In addition, the telephone automatically initiates a call to a remote computer and transmits the entered telephone number to the remote computer. The computer assigns an alphanumeric identifier to the telephone number and transmits the alphanumeric identifier back to the telephone which stores the alphanumeric identifier in the telephone memory in association with the telephone number. Accordingly, the telephone number can later be recalled and dialed through the use of the alphanumeric identifiers.

50 Claims, 7 Drawing Sheets

U.S. PATENT DOCUMENTS

| | | | | |
|---|---|---|---|---|
| 5,940,484 | A * | 8/1999 | DeFazio et al. | 379/142.06 |
| 5,940,752 | A | 8/1999 | Henrick | |
| 5,974,312 | A | 10/1999 | Hayes, Jr. et al. | |
| 5,995,826 | A | 11/1999 | Cox et al. | |
| 6,005,927 | A * | 12/1999 | Rahrer et al. | 379/142.01 |
| 6,049,796 | A | 4/2000 | Siitonen et al. | |
| 6,081,583 | A * | 6/2000 | Cheng et al. | 379/88.2 |
| 6,122,347 | A * | 9/2000 | Borland | 379/70 |
| 6,122,503 | A | 9/2000 | Daly | |
| 6,215,854 | B1 | 4/2001 | Walance | |
| 6,215,994 | B1 | 4/2001 | Schmidt et al. | |
| 6,292,668 | B1 | 9/2001 | Alanara et al. | |
| 6,321,098 | B1 * | 11/2001 | Beith et al. | 455/564 |
| 6,330,310 | B1 * | 12/2001 | Kurosawa | 379/111 |
| 6,377,950 | B1 | 4/2002 | Peters et al. | |
| 6,456,709 | B1 | 9/2002 | Cox et al. | |
| 2002/0004382 | A1 | 1/2002 | Cox et al. | |

FOREIGN PATENT DOCUMENTS

WO WO 94/30023 A1 12/1994

OTHER PUBLICATIONS

U.S. Appl. No. 09/217,065, filed Dec. 21, 1998, Hoyt A. Fleming, III.

U.S. Appl. No. 09/217,254, filed Dec. 21, 1998, Hoyt A. Fleming, III.

U.S. Appl. No. 09/241,426, filed Feb. 21, 1998, Hoyt A. Fleming, III.

* cited by examiner

METHOD OF PROGRAMMING TELEPHONE NUMBERS AND IDENTIFIERS IN A TELEPHONE

BACKGROUND OF THE INVENTION

1. Field of the Invention

The present invention relates to the field of telephones and, more particularly to a method of programming telephone numbers and telephone number identifiers into a telephone.

2. Description of the Related Art

In recent years, public use of wireless communication devices, such as wireless telephones, has increased greatly. Wireless telephones, such as cellular telephones, are typically either independently powered hand-held units or are mounted in vehicles.

Because of their mobility, wireless telephones must be light and compact. A user needs to be able to comfortably carry the telephone in a pocket, purse or briefcase. For example, it is common for a wireless telephone to have only a liquid crystal display (LCD), a numeric keypad, a very limited number of control buttons, such as a clear/end button, a send button and a power button. A personal digital assistant (PDA) incorporating a wireless telephone might include a touch sensitive or pen-based screen in addition to the above list of user-interface devices.

In recent years, wireless telephones have been manufactured with operating features identical to those found in conventional telephones. In addition, wireless telephones have been manufactured with paging and PDA features. Despite all of the technological advancements, wireless telephones are not without their shortcomings. For example, today's wireless telephones allow a user to program their frequently dialed telephone numbers into the memory of their telephone for later rapid dialing, but this programming function must be performed manually. Manual programming of the wireless telephone can take time and requires the user to remember how to perform the steps required to carry out the programming function.

The user can refer to the wireless telephone user manual to determine the steps required to properly program telephone numbers into the telephone. This, however, is not preferred since these manuals are rarely, if ever, carried around with the telephone. Without the manual the user will not be able to manually program telephone numbers into the wireless telephone. Even if the user locates the telephone manual, the user may still have difficulty in programming telephone numbers into the wireless telephone since some users may not understand the lengthy and detailed instructions. Accordingly, there is a need and desire for a method and apparatus for automatically programming telephone numbers into a wireless telephone.

Moreover, most wireless telephones also allow the user to associate and program an alphanumeric identifier for each telephone number stored in the telephone's memory. These alphanumeric identifiers may then be used to quickly recall and dial a stored telephone number without requiring a user to remember the called party's telephone number. Unfortunately, this programming function must also be performed manually and suffers from at least the same drawbacks associated with the programming of frequently dialed phone numbers. Accordingly, there is a need and desire for a method and apparatus for automatically programming a telephone number's alphanumeric identifier into a wireless telephone.

SUMMARY OF THE INVENTION

The present invention provides a method and apparatus for automatically programming telephone numbers into a telephone.

The present invention also provides a method and apparatus for automatically programming a telephone number's alphanumeric identifier into a telephone.

The above and other features and advantages of the invention are achieved by a method and telephone apparatus which detects when a telephone number has been entered into the telephone and determines if the entered telephone number has previously been stored in the memory of the telephone. If the entered telephone number has not been previously stored, it is then stored into memory. In addition, the telephone automatically initiates a call to a remote computer and transmits the entered telephone number to the remote computer. The computer assigns an alphanumeric identifier to the telephone number and transmits the alphanumeric identifier back to the telephone which stores the alphanumeric identifier in the telephone memory in association with the telephone number. Accordingly, the telephone number can later be recalled and dialed through the use of the alphanumeric identifiers.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

Although the invention is described below in the context of a cellular wireless telephone, the invention is not so limited and may be used with any type of telephone or other communication device where a series of numbers and/or symbols must be entered to establish a connection to a called party. Accordingly, the below detailed description of use of the invention with a cellular telephone is only representative and not limiting of the invention. Other embodiments may be utilized and structural, logical, or programming changes may be made without departing from the spirit or scope of the present invention.

Figure 1:
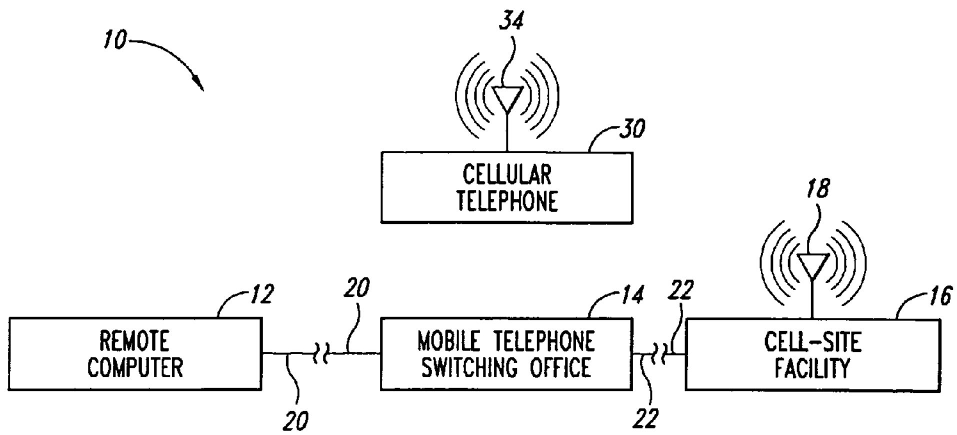
FIG. 1 illustrates a block diagram of a cellular wireless telephone system which can be used to practice the present invention.

FIG. 1 illustrates a block diagram of a cellular telephone system 10 which can be used to practice the present invention. The system 10 includes a remote computer 12 connected by a telephone line 20 to a Mobile Telephone Switching Office (MTSO) 14. The MTSO 14 is connected by a telephone line 22 to cellular telephone facility 16 (also referred to herein as a "cell-site facility 16"). The cell-site facility 16 includes an antenna 18 for transmitting voice and digital information via various voice and digital channels to an antenna 34 of a cellular telephone 30. The antenna 18 of the cell-site facility 16 is also used to receive voice and digital information via the various voice and digital channels from the antenna 34 of the cellular telephone 30. The system 10 could include more cell-site facilities 16 and cellular telephones 30 if so desired, but only one of facility 16 and telephone 30 are illustrated for convenience purposes.

As will be discussed below with reference to FIGS. 3–9, the present invention will utilize the remote computer 12 to retrieve alphanumeric identifiers associated with telephone numbers to be programmed into the telephone 30. Preferably, the remote computer 12 is a general purpose computer, such as the Micron CLIENTPRO™. The remote computer 12 will contain a modem so that it may be connected to the MTSO 14 by a plain old telephone system (POTS) telephone line 20.

The remote computer 12 will contain a database of at least telephone numbers and alphanumeric identifiers which have been assigned to each telephone number. The database residing in the remote computer 12 may also contain other information associated with each telephone number in the database. Additional information may include street address, city, state and any other information desired by the users of the cellular telephone 30. The remote computer 12 may be operated by a telephone company, cellular service provider, a company that manufactures and/or distributes cellular telephones, or even may be maintained and operated by a cellular telephone user.

As will be discussed below, the remote computer 12 is programmed to receive telephone calls via the modem, receive a telephone number from a telephone, perform a database search based on the received telephone number to determine if an alphanumeric identifier has been previously assigned to the received telephone number and if not, to assign one and to output back to the telephone the alphanumeric identifier (and other information if necessary) assigned to the telephone number. The remote computer 12 may communicate back to the telephone 30 directly over the telephone line 20, via e-mail, or even by paging the telephone 30 (if the telephone 30 has mail or paging capabilities).

The invention is implemented on the telephone side by the provision of some additional programming of the telephone processor, such as a cellular telephone processor, to enable the telephone to carry out the operations described herein. The invention may be implemented in any conventional cellular telephone which includes a processor to control the complex functions of the cellular telephone. Thus, the invention is not restricted to any particular cellular telephone circuit architecture.

Figure 2:
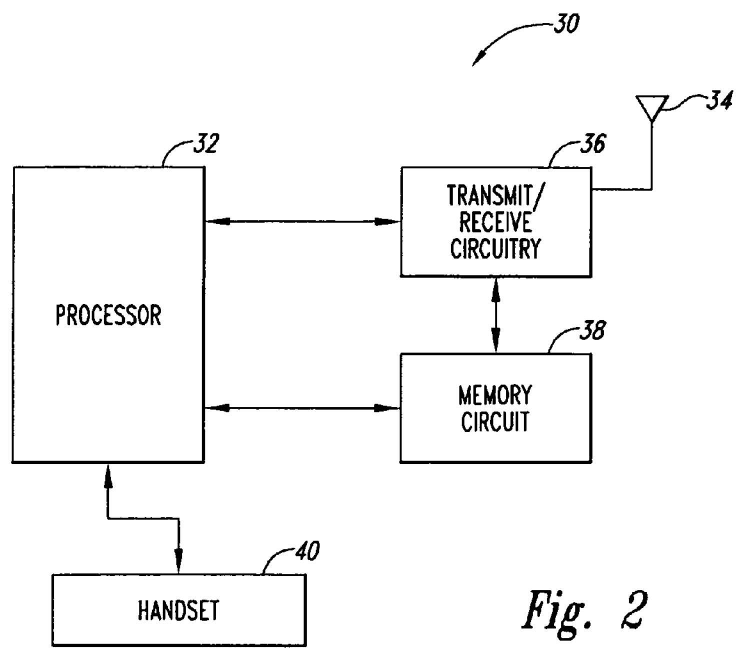
FIG. 2 illustrates an exemplary cellular wireless telephone used in the system of FIG. 1.

U.S. Pat. No. 5,109,403 to Sutphin shows one representative telephone circuit and associated processor which can be programmed to implement the invention and the disclosure of this patent is incorporated herein by reference. The '403 patent includes a microcomputer processor called a controller which interacts with various other circuits to enable the telephone to perform its cellular telephone operations. This controller is further programmed as described below to implement the invention. FIG. 2 illustrates in a high level block diagram a cellular telephone 30 having a processor serving as a controller 32, transmit/receive circuitry 36, memory circuit 38, antenna 34 and a handset 40 representative of the telephone disclosed in the '403 patent.

Figure 3:
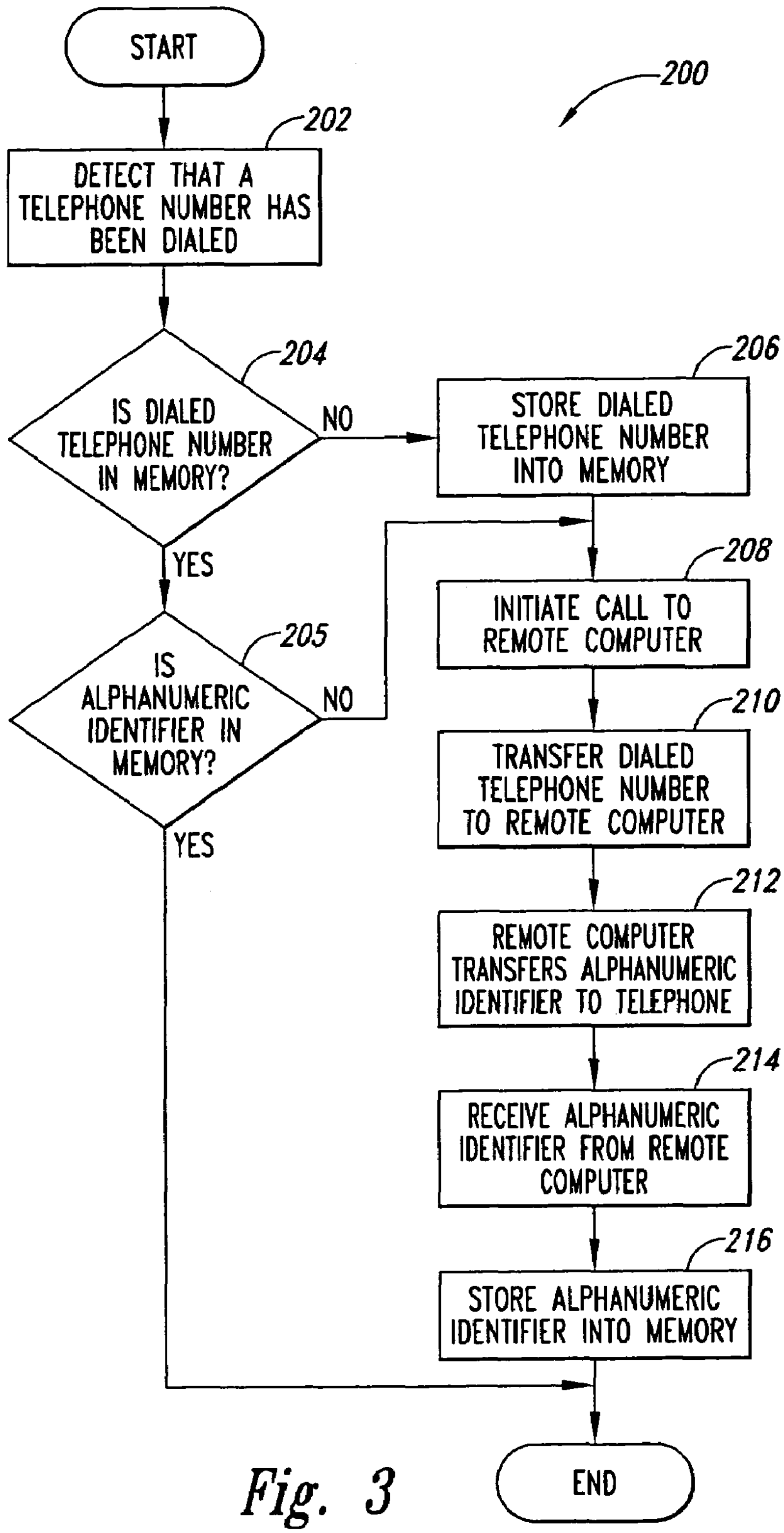
FIG. 3 is a flow chart illustrating a first embodiment of an automatic telephone number and alphanumeric identifier programming process.

FIG. 3 is a flow chart illustrating a first embodiment of an automatic telephone number and alphanumeric identifier programming process 200. Initially, the process 200 detects that a complete telephone number has been entered into the telephone (step 202). This may occur when a user is entering a telephone number to initiate a telephone call to that number. Likewise, the detection step 202 may occur when the user is entering a telephone number for the purpose of having it stored into the memory of the telephone. The entering of the telephone number can be performed by dialing on the keypad on the telephone handset or by voice activation if the telephone has this capability. For convenience purposes only, the term "dialing" or "dialed" will be used to refer to the entering of a telephone number into the telephone and encompasses manual dialing, voice activation or any other methodology or mechanism for entering telephone numbers into a telephone. Once a complete entered telephone number is detected, it is determined if the dialed telephone number is currently programmed in to the memory of the telephone (step 204). If the entered telephone number is stored into the memory of the telephone, an optional step 205 of determining if an alphanumeric identifier has been stored with the telephone number may be performed. If the optional step 205 is performed, and an alphanumeric identifier is not found, the process 200 continues at step 208 (described below) to initiate the retrieval of an identifier from a remote computer. If the optional step 205 is performed and an alphanumeric identifier is found, or if the optional step 205 is not performed, the process 200 is complete.

If the dialed telephone number is not stored into the memory of the telephone (step 204), the process continues at step 206 where the dialed telephone number is stored into the memory of the telephone. The dialed telephone number may be stored in a temporary memory, or it may be stored in other non-volatile memory of the telephone. Using non-volatile memory allows the process 200 to retain the dialed telephone number even if the user powers down the telephone.

Once the telephone number is stored into memory (step 206), a telephone call is initiated to the remote computer 12 illustrated in FIG. 1 (step 208). This step 208 may be performed immediately in which case the user's outgoing telephone call will be delayed until the process 200 is complete. Alternatively, the step 208 may be performed after the user completes the desired outgoing call. A timer may be used to distinguish between the situation where the user is initiating an outgoing call or when the user is initiating the programming of the telephone. For example, if the user does not press the "send" or "connect" button on the telephone key pad after a telephone number has been dialed within a certain amount of time, it will be presumed that the user is initiating the program function and the call to the remote computer will be initiated. Otherwise, the call to the remote computer will not be initiated until after the user terminates the call.

To initiate the call to the remote computer, the telephone number of the remote computer is pre-stored into the memory of the user's telephone. It is desirable, in some instances it may be preferable, to have the telephone number of the remote computer stored in the memory containing the software controlling the operation of the telephone. The number can be supplied by the service provider or entity responsible for maintaining the remote computer and can be programmed into the telephone's memory when the service is initiated or at any point thereafter.

As is known in the art, when the call to the remote computer is initiated, a MTSO assigns an available voice channel to the user's cellular telephone. The telephone then tunes to the frequency of the assigned channel. The MTSO couples the cell-site proximate to the user's telephone to the phone line of the remote computer. The remote computer answers the call. At this point, a voice channel is established between the remote computer and the user's telephone (via the cell-site and MTSO). At this point, conventional login/handshaking between the modems of the telephone and remote computer occur. An example of the login/handshaking is also found in the '403 patent to Sutphin. Once the login/handshaking is completed, digital data may be transmitted between the remote computer and the telephone.

The telephone transfers the dialed telephone number to the remote computer over the established channel by methods known in the art (step 210). The remote computer determines the telephone number of the calling cellular telephone using caller ID techniques and then receives the dialed telephone number and assigns an alphanumeric identifier to it. As stated above, depending on the capabilities of the telephone, the remote computer may also retrieve addressing or other pertinent information associated with the dialed telephone number from a database. Once retrieved, the remote computer transfers the alphanumeric identifier (and other stored database information) to the telephone over the established channel (step 212).

The alphanumeric and other information is received by the telephone over the voice channel (step 214) and the information is stored into the memory of the telephone (step 216). The telephone number and the associated alphanumeric identifier will be stored in a non-volatile memory to preserve the information. If temporary memory was used throughout the process, then the information must be transferred to the non-volatile memory before the telephone is powered down.

Once the dialed telephone number and its alphanumeric identifier are programmed into the memory of the telephone, the user may use the identifier to initiate telephone calls without dialing or even remembering the telephone number. The user may also retrieve the other associated information to perform PDA functions as well.

Figure 4:
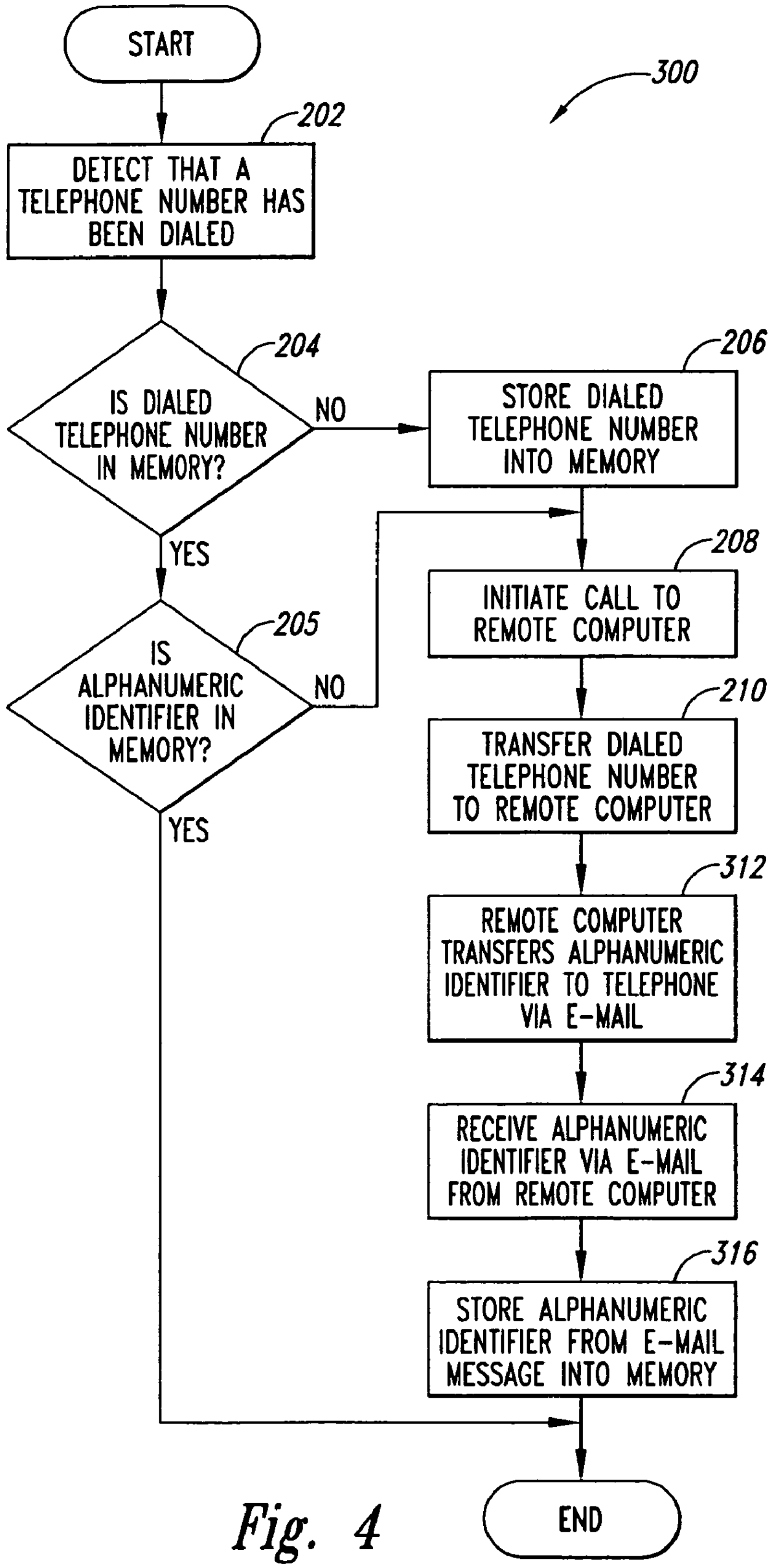
FIG. 4 is a flow chart illustrating a second embodiment of an automatic telephone number and alphanumeric identifier programming process.

FIG. 4 is a flow chart illustrating a second embodiment of an automatic telephone number and alphanumeric identifier programming process 300. The process 300 is implemented when the telephone has an e-mail capability. The process 300 is essentially the same as the process 200 (FIG. 3) except that the remote computer transfers the alphanumeric identifier and other information associated with the dialed telephone number via a subsequent short message service (SMS) e-mail to the user's telephone (step 312). The telephone receives the e-mail and parses out the alphanumeric identifier (and other information) from the e-mail message (step 314). The information parsed out of the e-mail message is then stored into the memory of the telephone (step 316). The alphanumeric identifier is stored in association with the telephone number it now identifies. It must be noted that e-mail or page can be used to transfer the dialed telephone number to the remote computer.

Figure 5:
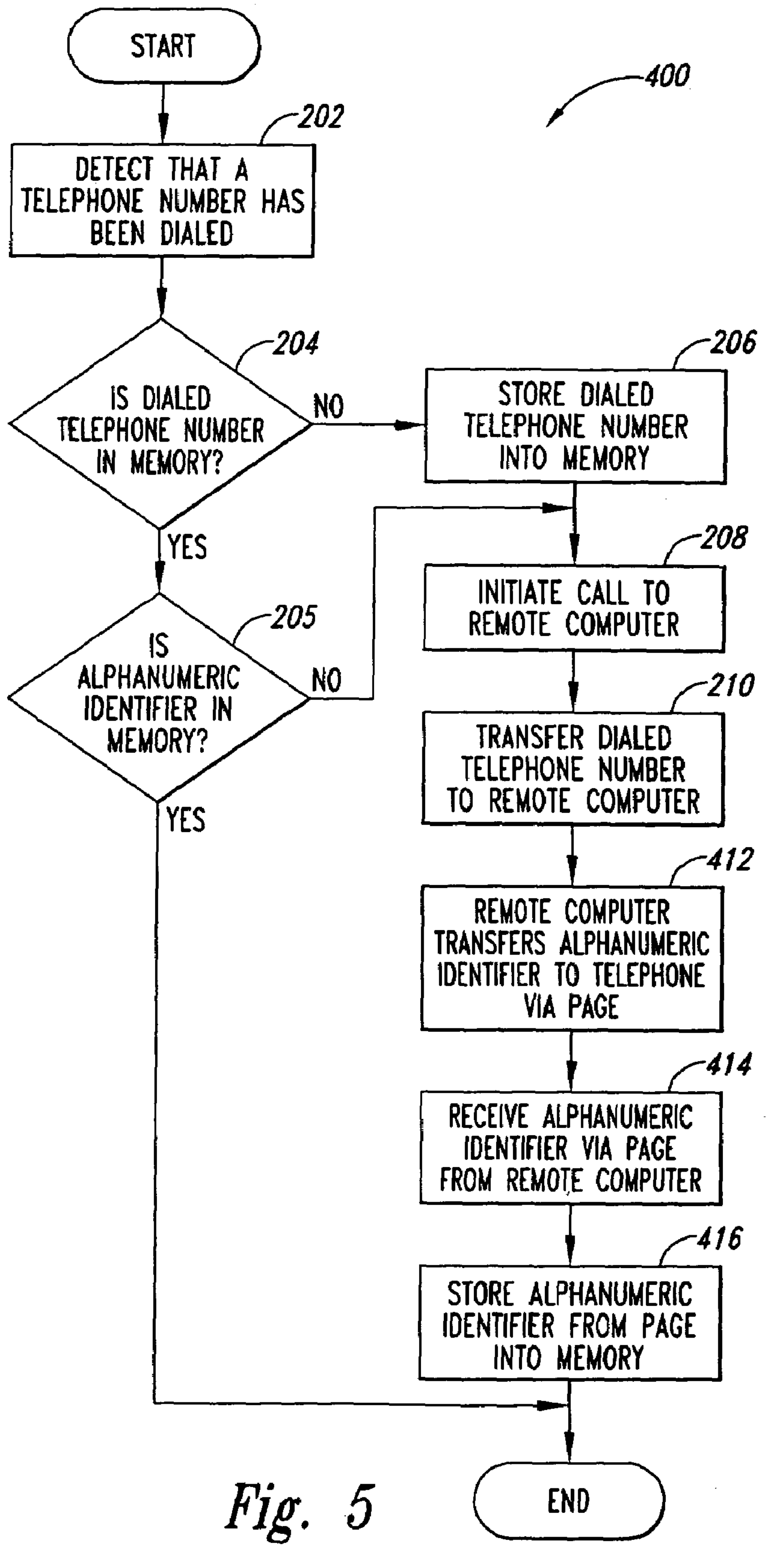
FIG. 5 is a flow chart illustrating a third embodiment of an automatic telephone number and alphanumeric identifier programming process.

FIG. 5 is a flow chart illustrating a third embodiment of an automatic telephone number and alphanumeric identifier programming process 400 performed by the present invention. The process 400 is desirable when the telephone has a paging capability. The process 400 is essentially the same as the process 200 (FIG. 3) except that the remote computer transfers the alphanumeric identifier and other information associated with the dialed telephone number via a subsequent page to the user's telephone (step 412). The telephone receives the page and parses out the alphanumeric identifier (and other information) from the page (step 414). The information parsed out of the page is then stored into the memory of the telephone (step 416). Again, the alphanumeric identifier is stored in association with the telephone number it now identifies.

Figure 10:
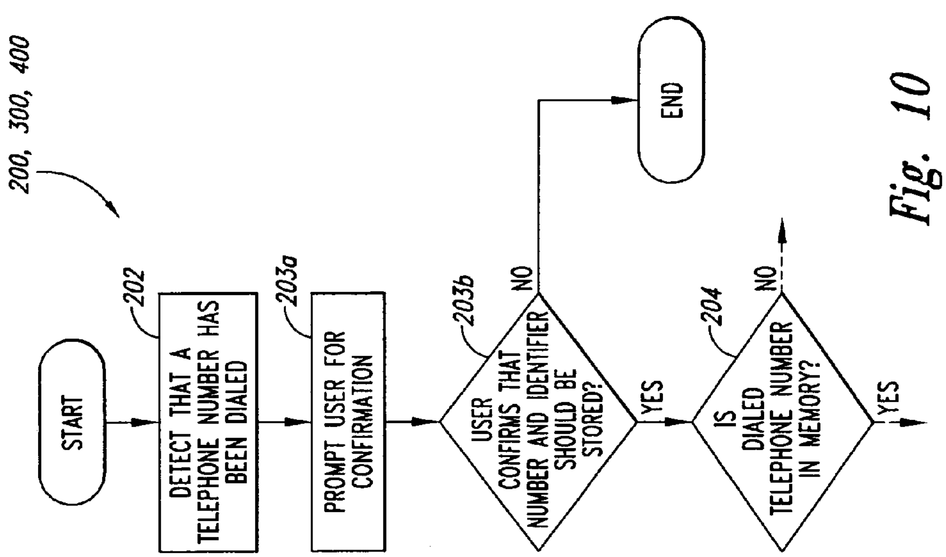
FIG. 10 is a flow chart illustrating a modification of the automatic telephone number and alphanumeric identifier programming processes of FIGS. 3–5.

The present invention can be modified in several ways. Referring to FIG. 10, for example, steps 203A and 203B can be inserted between steps 202 and 204 into any of the embodiments of the present invention to require the user for a keyboard entry in order to store the entered telephone number. That is, step 203A would prompt the user for a confirmation that the dialed telephone number and its received associated alphanumeric identifier should be stored in the memory of the telephone. At step 203B, if the user confirms that the number and information should be stored, the remaining steps of the process 200, 300 or 400 will be performed. If the user does not confirm that the number and associated information should be stored, the remaining steps of the process 200, 300 or 400 will not be performed.

Figure 11:
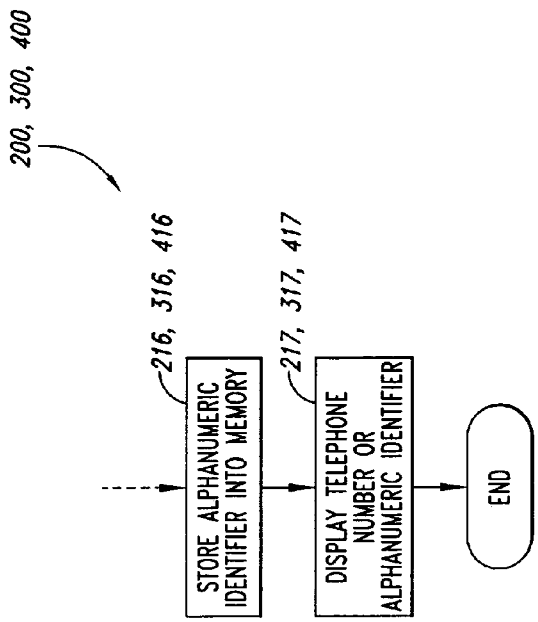
FIG. 11 is a flow chart illustrating an additional modification of the automatic telephone number and alphanumeric identifier programming processes of FIGS. 3–5.

In addition, the stored telephone number or its alphanumeric identifier can be displayed on the telephone's display if so desired. Referring to FIG. 11, this can be done as an optional step 217 of process 200 (FIG. 3) inserted after step 216, step 317 of process 300 (FIG. 4) inserted after step 316 or step 417 of process 400 (FIG. 5) inserted after step 416. In addition, due to the relatively low bandwidth required to transmit data between the remote computer and the telephone, tones of variable or constant durations can be used to transmit the information between the telephone and computer in any of the aforementioned embodiments.

Figure 6:
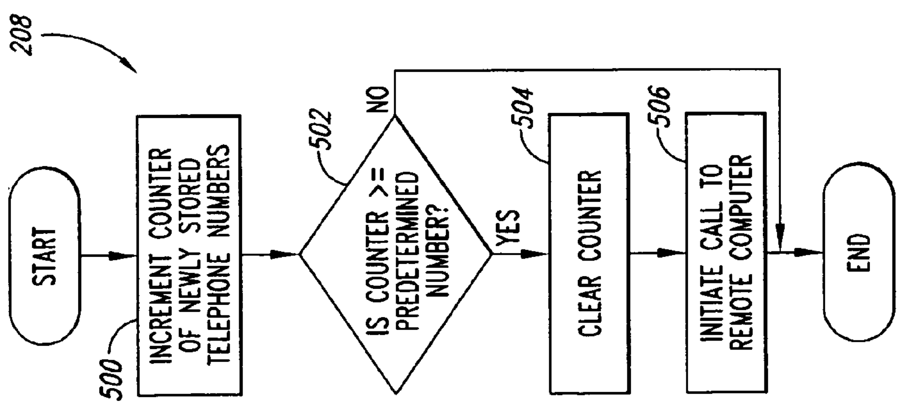
FIG. 6 is a flow chart illustrating a first alternative method of initiating a telephone call to a remote computer utilized by an embodiment of the present invention.

FIG. 6 illustrates a first alternative method of initiating a telephone call to the remote computer (step 208 of FIGS. 3–5). At step 500, a counter corresponding to a number of stored telephone numbers which need an associated alphanumeric identifier is incremented for a newly stored dialed telephone number. At step 502, it is determined if the counter has reached a predetermined number of stored telephone numbers. If the predetermined number has not been reached, a call will not be initiated to the remote computer and the processing of step 208 is complete causing the processing of FIGS. 3–5 to end. If the predetermined number has been reached, the counter is reset (step 504) and a call is initiated to the remote computer (step 506). At this point, the processing of step 208 is complete. Once the call to the remote computer is initiated, the present invention would repeat steps 210 to 216 (process 200), steps 210 to 316 (process 300) or steps 210 to 416 (process 400) to properly retrieve and store alphanumeric identifiers (and other information) for all of the newly stored telephone numbers.

Figure 7:
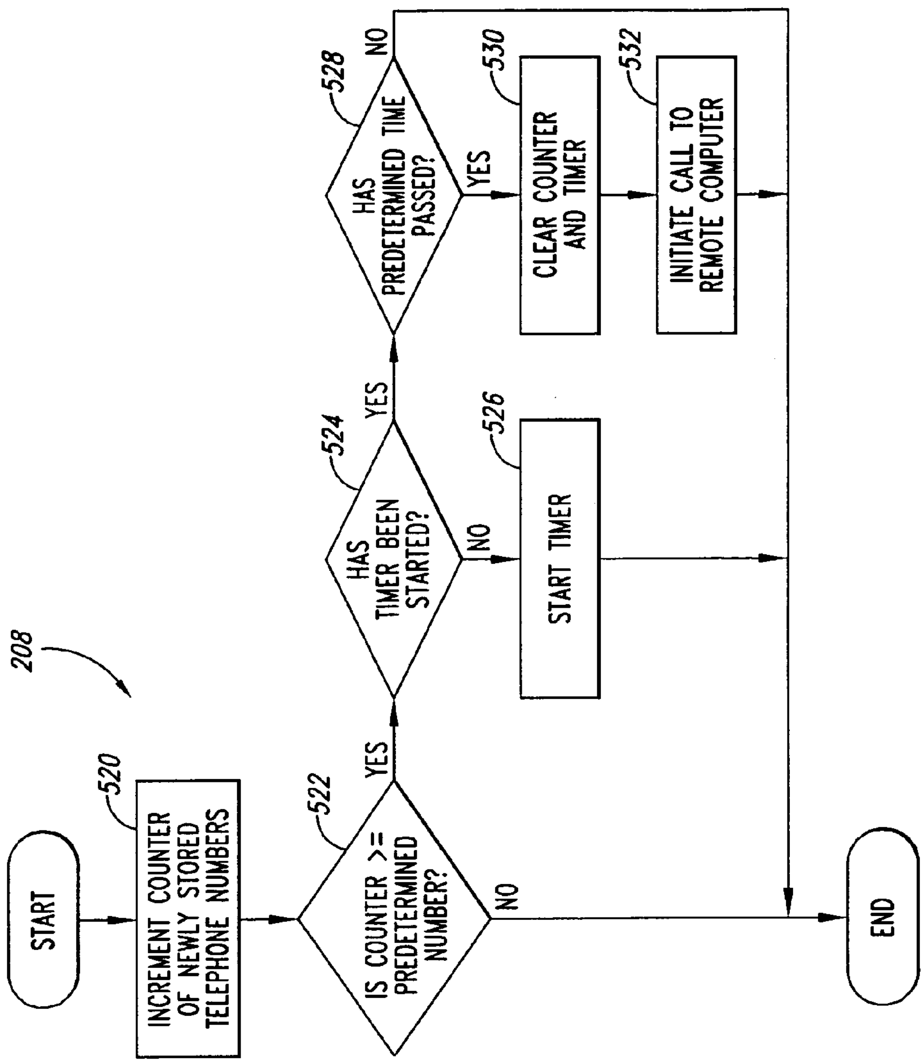
FIG. 7 is a flow chart illustrating a second alternative method of initiating a telephone call to a remote computer utilized by an embodiment of the present invention.

FIG. 7 illustrates a second alternative method of initiating a telephone call to the remote computer (step 208). At step 520, a counter corresponding to a number of newly stored telephone numbers is incremented for each newly stored dialed telephone number. At step 522, it is determined if the counter has reached a predetermined number of stored telephone numbers. If the predetermined number has not been reached, a call will not be initiated to the remote computer and the processing of step 208 is complete.

If the predetermined number has been reached, a determination is made as to whether a timer has been started (step 524). If the timer has not been started, a timer is started (step 526) and the processing of step 208 is complete. At this point a flag could be set to alert the telephone's controller to perform steps 524 to 532 at a later time if so desired. Otherwise, these steps will be performed the next time step 208 is performed (i.e., the next time a telephone number is stored).

If the timer has been started, a determination of whether the predetermined period of time has passed is made (step 528). If the predetermined time has not passed, the processing of step 208 is complete. At this point a flag could be set to alert the telephone's controller to perform steps 524 to 532 at a later time if so desired. Otherwise, these steps will be performed the next time step 208 is performed (i.e., the next time a telephone number is stored). If the predetermined time has passed, the counter and timer are reset (step 530) and a call is initiated to the remote computer (step 532). At this point, the processing of step 208 is complete. Once the call to the remote computer is initiated, the present invention would repeat steps 210 to 216 (process 200), steps 210 to 316 (process 300), or steps 210 to 416 (process 400) to properly retrieve and store alphanumeric identifiers (and other information) for all of the newly stored telephone numbers.

Figure 8:
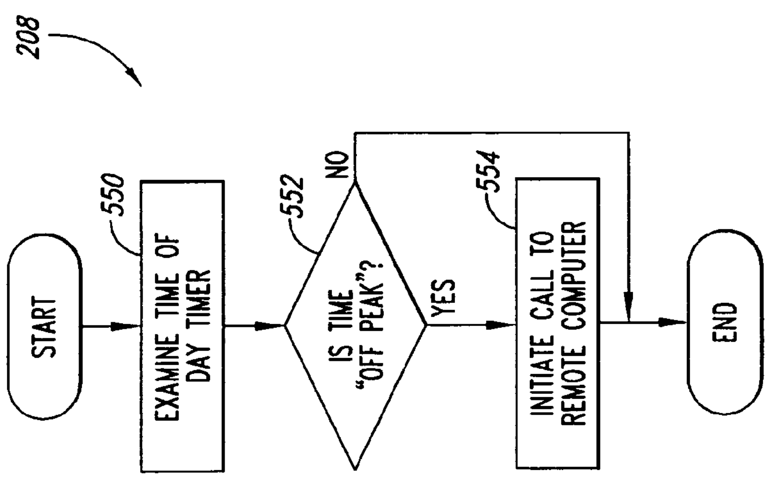
FIG. 8 is a flow chart illustrating a third alternative method of initiating a telephone call to a remote computer utilized by an embodiment of the present invention.

FIG. 8 illustrates a third alternative method of initiating a telephone call to the remote computer (step 208). At step 550, the time of day timer is examined. At step 552, it is determined if the time of day corresponds to an "off peak" time of day. An off peak time of day is a time when the user of the telephone is charged with a discounted or lower rate by the cellular service provider. An off peak telephone call to the remote computer would save the user money. If the time is an off peak time, a telephone call is initiated to the remote computer (step 554) and the processing of step 208 is complete. If the time is not an off peak time, a telephone call is not initiated and the processing of step 208 is complete. At this point a flag could be set to alert the telephone's controller to perform steps 550 to 554 at a later time if so desired. Otherwise, these steps will be performed the next time step 208 is performed (i.e., the next time a telephone number is stored).

Figure 9:
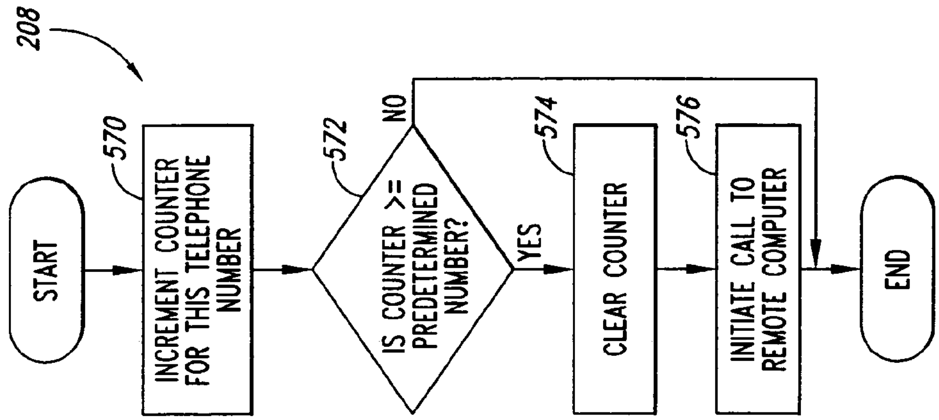
FIG. 9 is a flow chart illustrating a fourth alternative method of initiating a telephone call to a remote computer utilized by an embodiment of the present invention.

FIG. 9 illustrates a fourth alternative method of initiating a telephone call to the remote computer (step 208). At step 570, a counter corresponding to a number of times that a telephone number has been dialed is incremented for the detected dialed number. At step 572, it is determined if the counter has reached a predetermined number of detections for the telephone number. If the predetermined number has not been reached, a call will not be initiated to the remote computer and the processing of step 208 is complete. If the predetermined number has been reached, the counter is reset (step 574) and a call is initiated to the remote computer (step 576). At this point, the processing of step 208 is complete. This prevents the present invention from storing telephone numbers that are called infrequently.

The present invention is implemented in software and that the software instructions and data can be stored in PROM, EEPROM or other non-volatile memory of the telephone. The present invention can also be stored on a hard drive, floppy disc, CD-ROM or other permanent or semi-permanent storage medium and subsequently transferred to the memory of the telephone. The program embodying the present invention can also be divided into program code segments, downloaded, for example, from a server computer or transmitted as a data signal embodied in a carrier wave to the telephone as is known in the art. In addition, the present invention can be implemented in hardware or a combination of hardware and software.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of programming telephone numbers and information corresponding to the telephone numbers into a telephone comprising:

detecting at a telephone a telephone number which has been entered into the telephone;

determining if the entered telephone number is already stored into a memory of the telephone;

if the entered telephone number is not stored in the memory of the telephone:

prompting a user to confirm whether the entered telephone number should be stored into the memory of the telephone; and storing the entered telephone number into the memory of the telephone only if the user confirms that the entered telephone number should be stored;

initiating from the telephone a telephone call to a computer;

transferring the entered telephone number to the computer;

receiving information associated with the entered telephone number from the computer;

storing the received information into the memory of the telephone in association with the entered telephone number; and wherein the computer transfers the information associated with the entered telephone number to the telephone by an electronic mail message and the act of receiving the information is performed by receiving the electronic message.

2. The method of claim 1 wherein the telephone automatically prompts the user to confirm whether the entered telephone number should be stored into the memory of the telephone if the entered telephone number is not stored in the memory of the telephone.

3. The method of claim 1 wherein the act of initiating a telephone call to a computer is performed after a predetermined period of time has elapsed from the time the entered telephone number was entered into the telephone.

4. The method of claim 1 wherein the act of initiating a telephone call to a computer is performed after a user has completed a telephone call to the entered telephone number.

5. The method of claim 1 wherein the act of initiating a telephone call to a computer is performed after a predetermined number of entered telephone numbers have been stored into the memory of the telephone.

6. The method of claim 5 wherein the act of initiating a telephone call to a computer is performed after a predetermined time period has elapsed from the time the predetermined number of entered telephone numbers were stored into the memory of the telephone.

7. The method of claim 1 wherein the act of initiating a telephone call to a computer is performed only during off peak time intervals.

8. The method of claim 1 wherein the act of initiating a telephone call to a computer is performed after an entered telephone number has been entered a predetermined number times.

9. The method of claim 1 wherein the information associated with the entered telephone number comprises an alphanumeric identifier associated with the entered telephone number which can be used by the user to retrieve and dial the associated telephone number.

10. The method of claim 1 wherein the information associated with the entered telephone number comprises an alphanumeric identifier which can be used by the user to retrieve and dial the associated telephone number and an address associated with the entered telephone number.

11. The method of claim 1 further comprising displaying the information associated with the entered telephone on a display of the telephone.

12. A method of programming telephone numbers and information corresponding to the telephone numbers into a telephone comprising:

detecting at a telephone a telephone number which has been entered into the telephone;

determining if the entered telephone number is already stored into a memory of the telephone;

if the entered telephone number is not stored in the memory of the telephone:

prompting a user to confirm whether the entered telephone number should be stored into the memory of the telephone; and storing the entered telephone number into the memory of the telephone only if the user confirms that the entered telephone number should be stored;

initiating from the telephone a telephone call to a computer;

transferring the entered telephone number to the computer;

receiving information associated with the entered telephone number from the computer;

storing the received information into the memory of the telephone in association with the entered telephone number; and wherein the computer transfers the information associated with the entered telephone number to the telephone by paging the telephone and the act of receiving the information is performed by receiving the page.

13. A telephone comprising:

an input device for inputting dialed telephone numbers:

a memory circuit; and a programmed processor, said programmed processor is programmed to:

detect a telephone number which has been entered into said telephone;

determine if the entered telephone number is already stored into said memory;

if the entered telephone number is not stored in said memory:

prompt a user to confirm whether the entered telephone number should be stored into said memory; and store the entered telephone number into said memory only if the user confirms that the entered telephone number should be stored initiate a telephone call to a computer;

transfer the entered telephone number to the computer;

receive information associated with the entered telephone number from the computer;

store the received information into said memory in association with the entered telephone number; and wherein the computer transfers the information associated with the entered telephone number to the telephone by paging the telephone and said processor is programmed to receive the information by receiving the page.

14. The telephone of claim 13 wherein said processor is programmed to automatically prompt the user of said telephone to confirm whether the entered telephone number should be stored into said memory if the entered telephone number is not stored in said memory.

15. The telephone of claim 13 wherein said processor is programmed to initiate a telephone call to the computer after a predetermined period of time has elapsed from the time the entered telephone number was entered into the telephone.

16. The telephone of claim 13 wherein said processor is programmed to initiate a telephone call to the computer after a user has completed a telephone call to the entered telephone number.

17. The telephone of claim 13 wherein said processor is programmed to initiate a telephone call to the computer after a predetermined number of entered telephone numbers have been stored into said memory.

18. The telephone of claim 17 wherein said processor is programmed to initiate a telephone call to the computer after a predetermined time period has elapsed from the time the predetermined number of entered telephone numbers were stored into said memory.

19. The telephone of claim 13 wherein said processor is programmed to initiate a telephone call to the computer is only during off peak time intervals.

20. The telephone of claim 13 wherein said processor is programmed to initiate a telephone call to the computer after an entered telephone number has been entered a predetermined number times.

21. The telephone of claim 13 wherein the information associated with the entered telephone number comprises an alphanumeric identifier associated with the entered telephone number which can be used by the user to retrieve and dial the associated telephone number.

22. The telephone of claim 13 wherein the information associated with the entered telephone number comprises an alphanumeric identifier which can be used by the user to retrieve and dial the associated telephone number and an address associated with the entered telephone number.

23. The telephone of claim 13 further comprising a display for displaying the information associated with the entered telephone.

24. A telephone comprising:

an input device for inputting dialed telephone numbers;

a memory circuit; and a programmed processor, said programmed processor is programmed to:

detect a telephone number which has been entered into said telephone;

determine if the entered telephone number is already stored into said memory;

if the entered telephone number is not stored in said memory:

prompt a user to confirm whether the entered telephone number should be stored into said memory; and store the entered telephone number into said memory only if the user confirms that the entered telephone number should be stored initiate a telephone call to a computer;

transfer the entered telephone number to the computer;

receive information associated with the entered telephone number from the computer;

store the received information into said memory in association with the entered telephone number; and wherein the computer transfers the information associated with the entered telephone number to the telephone by an electronic mail message and said processor is programmed to receive the information by receiving the electronic message.

25. A telephone system comprising:

a computer, said computer having a database of telephone numbers and information associated with the telephone numbers; and a telephone comprising:

an input device for entering telephone numbers;

a memory circuit; and a programmed processor, said programmed processor is programmed to:

detect a telephone number which has been entered into said telephone;

determine if the entered telephone number is already stored into said memory;

if the entered telephone number is not stored in said memory, store the entered telephone number into said memory;

initiate a telephone call to said computer;

transfer the entered telephone number to said computer;

receive information associated with the entered telephone number from said computer;

store the received information into said memory in association with the entered telephone number; and wherein said computer transfers the information associated with the entered telephone number to the telephone by an electronic mail message and said processor is programmed to receive the information by receiving the electronic message.

26. The system of claim 25 wherein said processor is programmed to prompt a user of said telephone to confirm whether the entered telephone number should be stored into said memory and stores said entered telephone number only if the user confirms that the entered telephone number should be stored.

27. The system of claim 25 wherein the telephone call to the computer is initiated only if the entered number was determined not to be already stored into said memory.

28. The system of claim 25 wherein said processor is programmed to initiate a telephone call to said computer after a predetermined period of time has elapsed from the time the entered telephone number was entered into the telephone.

29. The system of claim 25 wherein said processor is programmed to initiate a telephone call to said computer after a user has completed a telephone call to the entered telephone number.

30. The system of claim 25 wherein said processor is programmed to initiate a telephone call to said computer after a predetermined number of entered telephone numbers have been stored into said memory.

31. The system of claim 30 wherein said processor is programmed to initiate a telephone call to said computer after a predetermined time period has elapsed from the time the predetermined number of entered telephone numbers were stored into said memory.

32. The system of claim 25 wherein said processor is programmed to initiate a telephone call to said computer is only during off peak time intervals.

33. The system of claim 25 wherein said processor is programmed to initiate a telephone call to said computer after an entered telephone number has been entered a predetermined number times.

34. The system of claim 25 wherein the information associated with the entered telephone number comprises an alphanumeric identifier associated with the entered telephone number which can be used by the user to retrieve and dial the associated telephone number.

35. The system of claim 34 wherein the information associated with the entered telephone number comprises an alphanumeric identifier which can be used by the user to retrieve and dial the associated telephone number and an address associated with the entered telephone number.

36. The system of claim 25 further comprising a display for displaying the information associated with the entered telephone.

37. A telephone system comprising:

a computer, said computer having a database of telephone numbers and information associated with the telephone numbers; and a telephone comprising:

an input device for entering telephone numbers;

a memory circuit; and a programmed processor, said programmed processor is programmed to:

detect a telephone number which has been entered into said telephone;

determine if the entered telephone number is already stored into said memory;

if the entered telephone number is not stored in said memory, store the entered telephone number into said memory;

initiate a telephone call to said computer;

transfer the entered telephone number to said computer;

receive information associated with the entered telephone number from said computer;

store the received information into said memory in association with the entered telephone number; and wherein said computer transfers the information associated with the entered telephone number to the telephone by paging the telephone and said processor is programmed to receive the information by receiving the page.

38. A telephone system comprising:

a computer, said computer having a database of telephone numbers and information associated with the telephone numbers; and a telephone comprising:

an input device for entering telephone numbers;

a memory circuit; and a controller coupled to said memory circuit, said controller:

detecting a telephone number which has been entered into said telephone;

determining if the entered telephone number is already stored into said memory;

if the entered telephone number is not stored in said memory storing the entered telephone number into said memory;

initiating a telephone call to said computer;

transferring the entered telephone number to said computer;

receiving information associated with the entered telephone number from said computer;

storing the received information into said memory in association with the entered telephone number; and wherein said computer transfers the information associated with the entered telephone number to the telephone by paging the telephone and said controller receives the information by receiving the page.

39. The system of claim 38 wherein said controller prompts a user of said telephone to confirm whether the entered telephone number should be stored into said memory and stores said entered telephone number only if the user confirms that the entered telephone number should be stored.

40. The system of claim 38 wherein the controller initiates the telephone call to the computer only if the entered number was determined not to be already stored into said memory.

41. The system of claim 38 wherein said controller initiates a telephone call to said computer after a predetermined period of time has elapsed from the time the entered telephone number was entered into the telephone.

42. The system of claim 41 wherein said controller initiates a telephone call to said computer after a user has completed a telephone call to the entered telephone number.

43. The system of claim 38 wherein said controller initiates a telephone call to said computer after a predetermined number of entered telephone numbers have been stored into said memory.

44. The system of claim 38 wherein said controller initiates a telephone call to said computer after a predetermined time period has elapsed from the time the predetermined number of entered telephone numbers were stored into said memory.

45. The system of claim 38 wherein said controller initiates a telephone call to said computer is only during off peak time intervals.

46. The system of claim 38 wherein said controller initiates a telephone call to said computer after an entered telephone number has been entered a predetermined number times.

47. The system of claim 38 wherein the information associated with the entered telephone number comprises an alphanumeric identifier associated with the entered telephone number which can be used by the user to retrieve and dial the associated telephone number.

48. The system of claim 38 wherein the information associated with the entered telephone number comprises an alphanumeric identifier which can be used by the user to retrieve and dial the associated telephone number and an address associated with the entered telephone number.

49. The system of claim 38 further comprising a display for displaying the information associated with the entered telephone.

50. A telephone system comprising:

a computer, said computer having a database of telephone numbers and information associated with the telephone numbers; and a telephone comprising:

an input device for entering telephone numbers;

a memory circuit; and a controller coupled to said memory circuit, said controller:

detecting a telephone number which has been entered into said telephone;

determining if the entered telephone number is already stored into said memory;

if the entered telephone number is not stored in said memory, storing the entered telephone number into said memory;

initiating a telephone call to said computer;

transferring the entered telephone number to said computer;

receiving information associated with the entered telephone number from said computer;

storing the received information into said memory in association with the entered telephone number; and wherein said computer transfers the information associated with the entered telephone number to the telephone by an electronic mail message and said controller receives the information by receiving the electronic message.

* * * * *